(12) United States Patent
Fisher

(10) Patent No.: US 6,682,222 B2
(45) Date of Patent: Jan. 27, 2004

(54) BI-DIRECTIONAL OIL SCOOP FOR BEARING LUBRICATION

(75) Inventor: Kenneth Lee Fisher, Lockland, OH (US)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 09/934,768

(22) Filed: Aug. 22, 2001

(65) Prior Publication Data
US 2003/0039421 A1 Feb. 27, 2003

(51) Int. Cl.[7] ............................................... F16C 19/00
(52) U.S. Cl. ..................... 384/462; 384/468; 384/474
(58) Field of Search ........................ 384/467, 462, 384/468, 471, 472, 473, 465, 474, 475, 466; 60/39.08; 184/6.9, 6.11

(56) References Cited

U.S. PATENT DOCUMENTS

| 2,848,284 | A | * | 8/1958 | Atkinson et al. | 384/466 |
| 2,849,262 | A | * | 8/1958 | Wood, Jr. et al. | 384/468 |
| 2,878,894 | A | * | 3/1959 | Andrews | 384/466 |
| 3,325,232 | A | | 6/1967 | Pabst et al. | |
| 3,909,085 | A | * | 9/1975 | Wilkinson et al. | 384/517 |
| 3,940,191 | A | * | 2/1976 | Tomioka et al. | 384/468 |
| 4,344,506 | A | * | 8/1982 | Smith | 184/6.11 |
| 4,576,001 | A | * | 3/1986 | Smith | 60/39.08 |
| 5,261,751 | A | * | 11/1993 | Heinz | 384/466 |
| 5,489,190 | A | * | 2/1996 | Sullivan | 184/6.11 |
| 5,683,224 | A | * | 11/1997 | Sebald et al. | 384/475 |
| 5,890,881 | A | * | 4/1999 | Adeff | 415/111 |
| 5,904,427 | A | * | 5/1999 | Braun et al. | 384/472 |

FOREIGN PATENT DOCUMENTS

JP    58-166191    * 10/1983

* cited by examiner

Primary Examiner—Christopher P. Schwartz
Assistant Examiner—Melanie Torres
(74) Attorney, Agent, or Firm—Nathan D. Herkamp; Gregory A. Welte

(57) ABSTRACT

A fluid multiplexer for delivering lubricant to bearings in a gas turbine engine. The bearings are adjacent bearing races on a shaft. Lubricant passages within the shaft extend from the races to scoops on the surface of the shaft. A nozzle ejects a jet of lubricant across open space toward the scoops. As the shaft rotates, the scoops sequentially cross the jet, each scoop collecting a charge of lubricant, which it delivers to its passage.

17 Claims, 6 Drawing Sheets

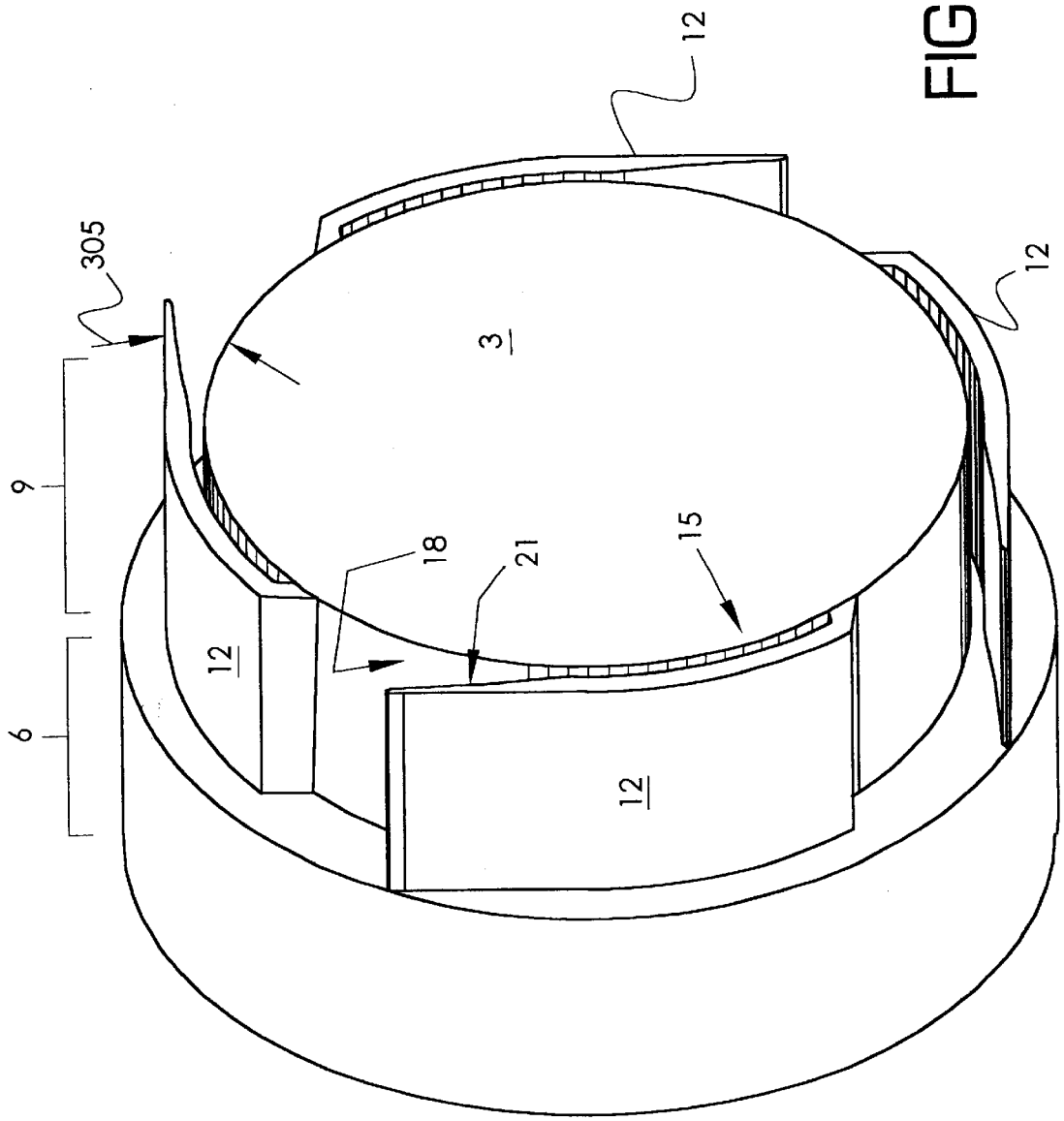

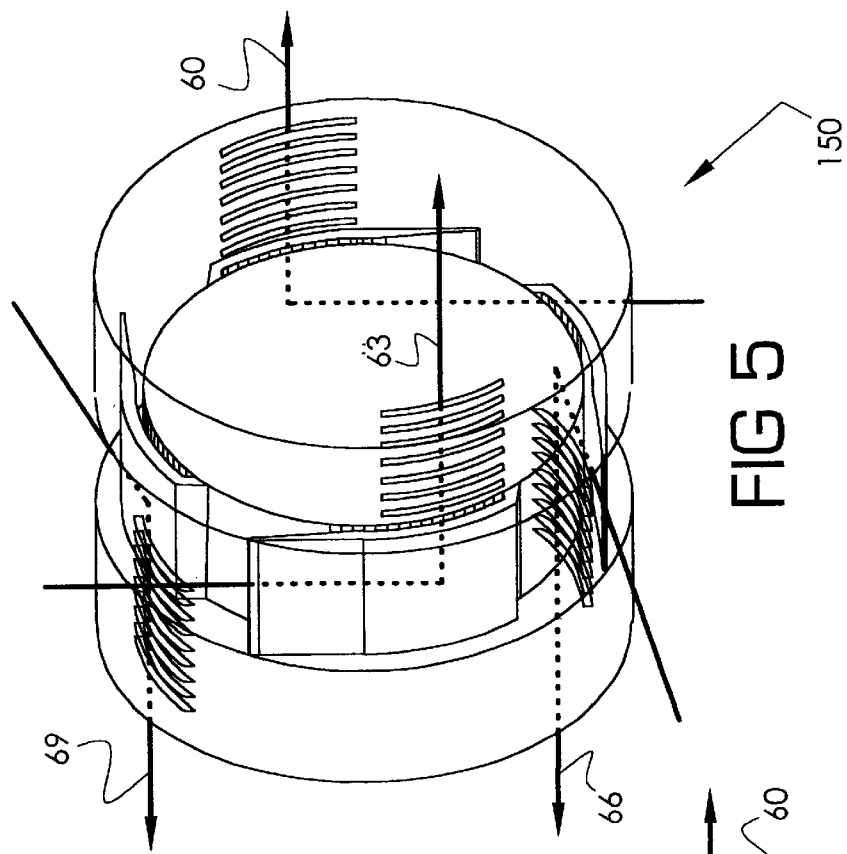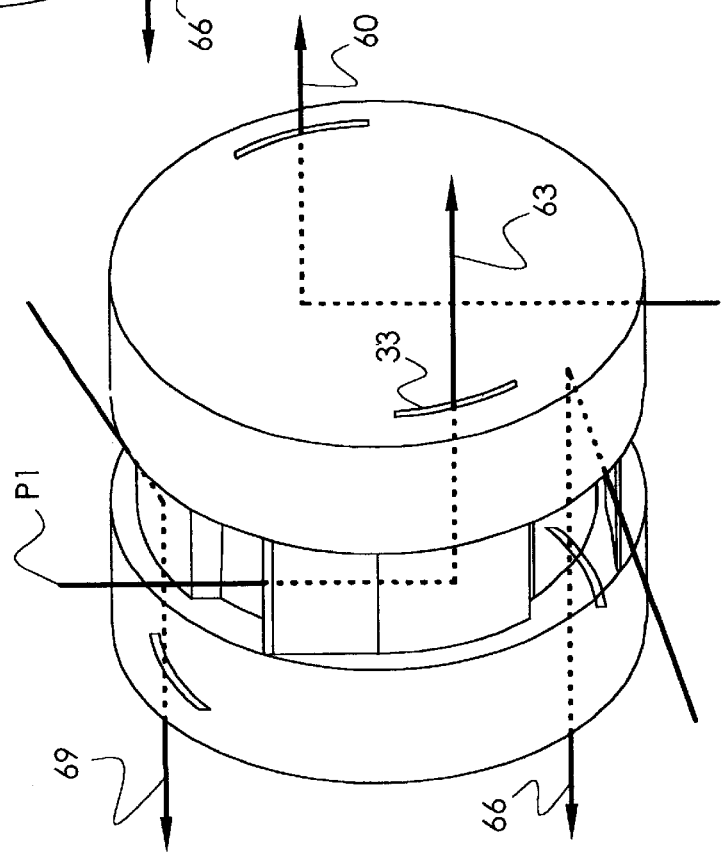

BI-DIRECTIONAL OIL SCOOP FOR BEARING LUBRICATION

TECHNICAL FIELD

The invention concerns lubrication for bearings and, specifically, a system for delivering liquid lubricant to a pair of bearings in a confined space in a gas turbine engine.

BACKGROUND OF THE INVENTION

Many gas turbine engines contain dual bearings which must be lubricated. Some of these bearings are located in positions which are crowded by other components. In this situation, lubricant pathways cannot be freely routed, but the pathways must accommodate the other components.

The invention provides a solution to this type of routing problem. A prior-art device which includes one or more of the principles implemented by the invention is found in U.S. Pat. No. 3,325,232, "Shaft Sealing and Cooling Means," issued on Jun. 13, 1967, to R. H. Pabst et al. This patent is hereby incorporated by reference.

SUMMARY OF THE INVENTION

In one form of the invention, fluid is delivered to a multi-row bearing system in a gas turbine engine by ejecting a jet which crosses open space, and is captured by a receiver which communicates with the bearing system.

BRIEF DESCRIPTION OF THE DRAWINGS

FIG. 1 illustrates a vaned apparatus utilized by the invention.

FIGS. 4 and 5 illustrate fluid paths running through the apparatus of FIGS. 2 and 3.

DETAILED DESCRIPTION OF THE INVENTION

Figure 3:
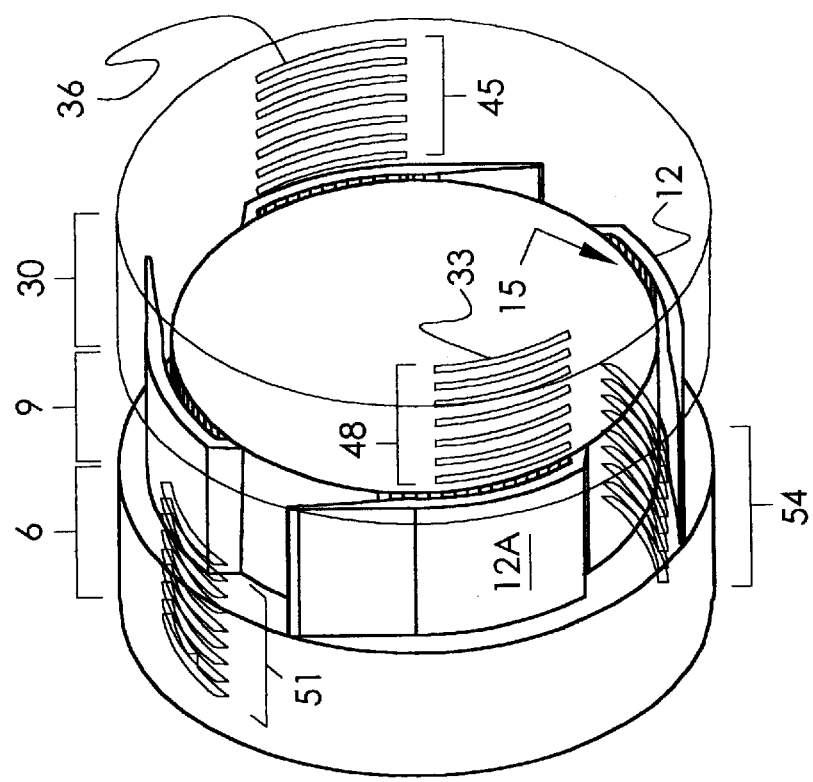
FIGS. 2 and 3 are views of parts of the invention.

FIG. 1 illustrates a shaft 3, which contains a large-diameter region 6 and a small diameter region 9. The small-diameter region 9 contains vanes 12. A space 15 exists between the outer circumference 18 of the small-diameter region 9 and the inner surface 21 of each vane 12.

Figure 2:
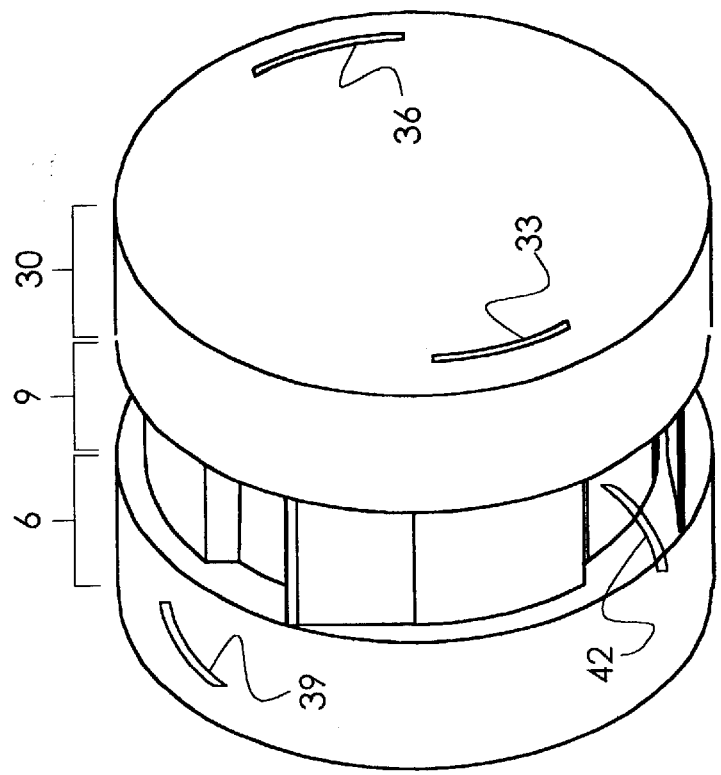

FIG. 2 shows a second large-diameter region 30 attached to the apparatus of FIG. 1. The ends 33 and 36 of two lubricant passages (not shown) are shown. The large-diameter region 6 is drawn as transparent, in order to show two corresponding ends 39 and 42 of two other lubricant passages (not shown).

FIG. 3 shows the lubricant passages not shown in FIG. 2. FIG. 3 illustrates the two large-diameter regions 6 and 30 as transparent, in order to show internal passages 45, 48, 51, and 54, which are illustrated by sequences of cross-sections. Each passage connects to a respective space 15 located beneath a vane 12. FIG. 1 also shows the spaces 15.

FIG. 4 illustrates four flowpaths 60, 63, 66, and 69 which the invention provides. For example, flowpath 63 begins at point P1, runs through the space 15 in FIG. 1 beneath vane 12, runs through passage 48 in FIG. 3, and exits through the end 33 in FIG. 4.

FIG. 5 shows the flowpaths 60, 63, 66, and 69 superimposed on the structure of FIG. 3.

Figure 6:
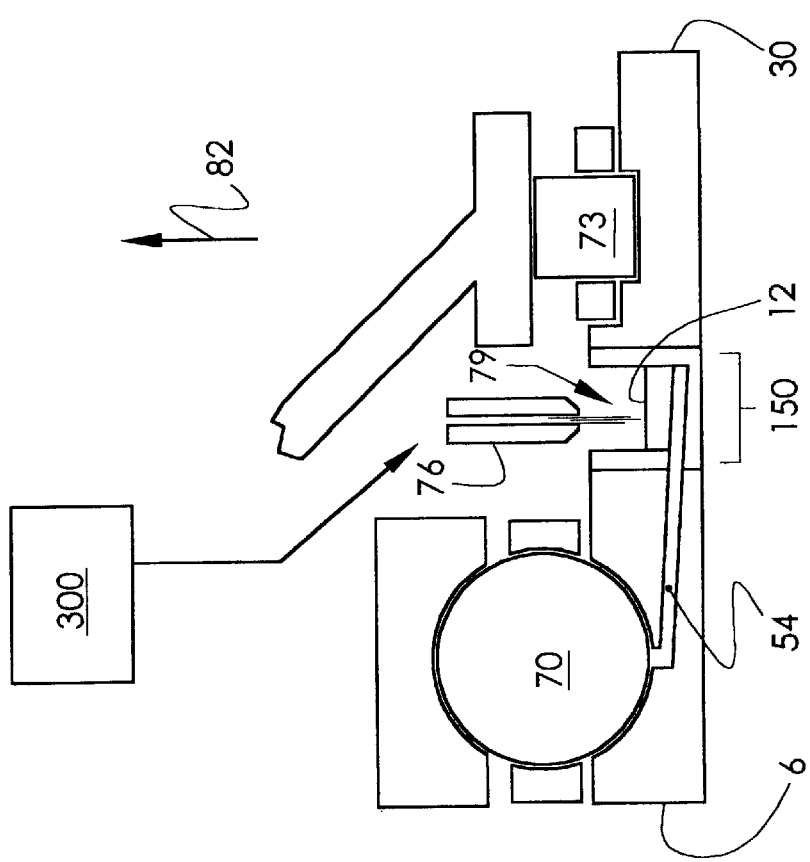

FIG. 6 shows the outer circumferences of the two large-diameter regions 6 and 30 of FIG. 1, in cross-section. Part of a vane 12 is also shown in FIG. 6. FIG. 6 also shows a ball bearing 70, a roller bearing 73 and a nozzle 76. The nozzle 76 expels a jet 79 of oil, or other lubricant. Passage 54 corresponds to passage 54 in FIG. 3. Thus, pathway 66 in FIGS. 4 and 5 (not shown in FIG. 6) runs along that passage 54.

As later described, vane 12 in FIG. 6 captures the oil jet 79, and diverts it into passage 54, which delivers the oil to bearing 70. Passage 54 slopes radially outward, in the direction of arrow 82, as it approaches bearing 70. The apparatus of FIG. 6 rotates in operation, causing centrifugal force to run in the direction of arrow 82. Centrifugal force causes the oil to run along passage 54 toward the bearing 70.

Figure 7:
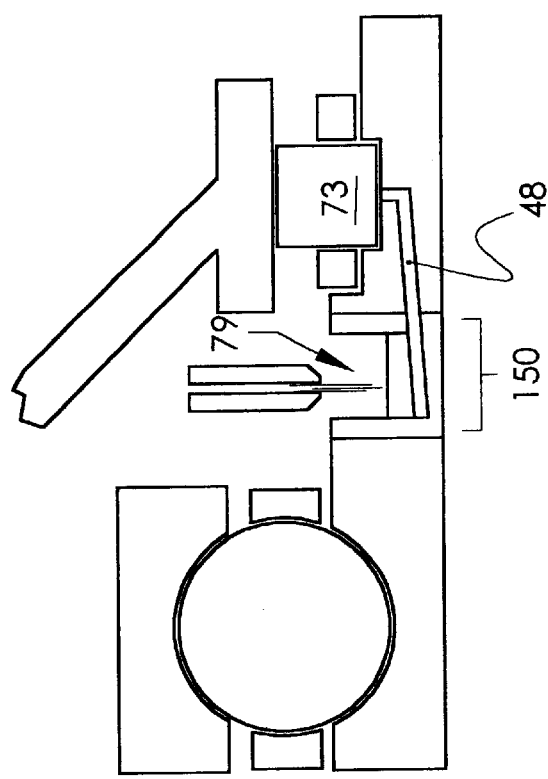
FIGS. 6 and 7 are cross-sectional views of bearings fed by a pathway of the type shown in FIGS. 4 and 5.

FIG. 7 shows the same structure as in FIG. 6, but with passage 48 of FIG. 3 now receiving the oil jet 79. The oil jet is now delivered to roller bearing 73. As rotation continues, oil is alternately delivered to a passage on the left in FIG. 3, such as passage 54, and then to a passage on the right in FIG. 3, such as passage 45.

Figure 8:
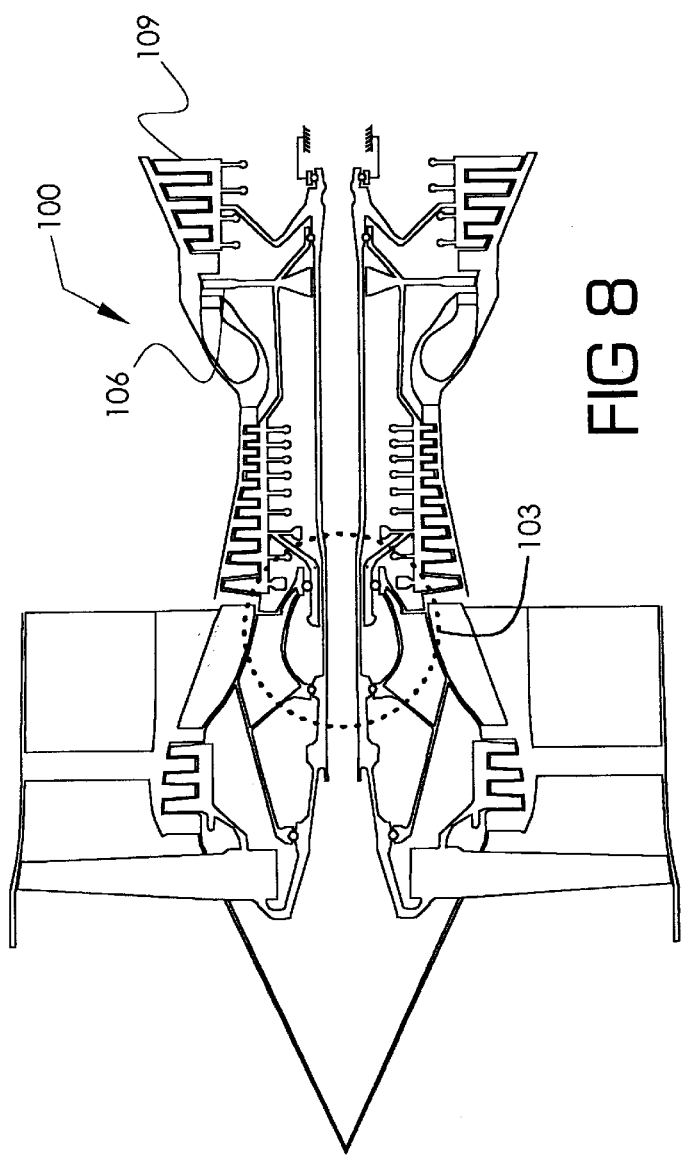
FIG. 8 is a simplified schematic of a generic gas turbine engine.

FIG. 8 is a simplified schematic of a gas turbine engine 100. The apparatus of FIGS. 6 and 7 can be located in the region indicated by dashed circle 103. These bearings support either the high-pressure turbine 106, the low pressure turbine 109, or both. The bearings are of the type shown in FIGS. 6 and 7, that is, containing (1) a row of roller bearings and (2) a row of ball bearings.

Figure 10:
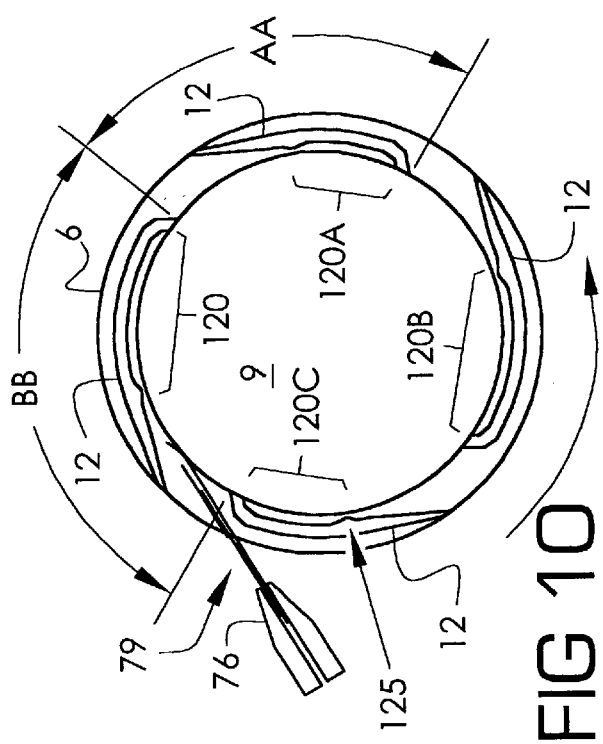

FIGS. 10–13 illustrates the apparatus of FIG. 1, in cross-section, together with jet 79 and the nozzle 76. In FIG. 10, the jet 79 crosses a space between the nozzle 76 and the vane 12. That is, there is no pipe or fluid coupling between the nozzle 76 and the vane 12. The jet 79 is directed to region 120 beneath the vane 12, which communicates with a passage, such as passage 51 in FIG. 3.

Each vane 12 contains a constriction 125 which the jet 79 must pass. Further, the constriction 125 is not merely a reduction in cross-sectional area of the space 15 beneath the vane 12. The constriction acts as a potential barrier for the jet 79, once the jet reaches region 120.

That is, region 120 is downhill of constriction 125, in a centrifugal sense. If oil contained within region 120 is to flow backward, toward the nozzle 76, it must climb a centrifugal gradient, and surmount constriction 125. This explains why constriction 125 is not merely a constriction. A mere constriction could also be attained by fabricating a bump on surface 18 in FIG. 1. However, a bump on that surface would not create an adverse centrifugal gradient for fluid present in region 120 in FIG. 10.

Stating the preceding another way, constriction 125 acts as a centrifugal high point on a path such as path 63 in FIG. 5.

Figure 9:
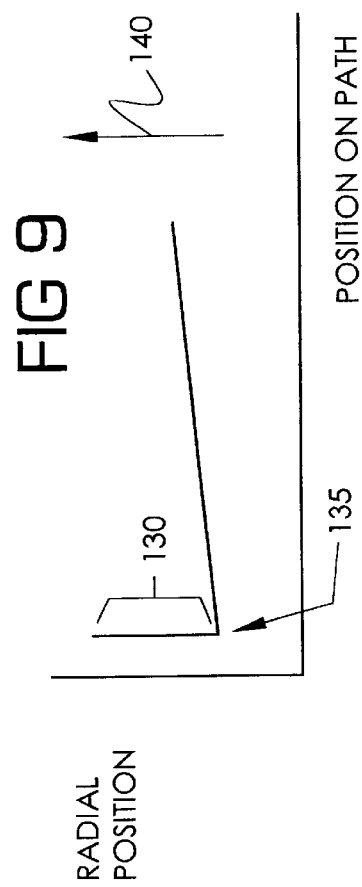
FIG. 9 illustrates radial position plotted against position along one of the pathways shown in FIGS. 4 and 5.

FIG. 9 plots radial position of the fluid as it travels along such a path. Region 130 corresponds to fluid travelling through nozzle 76 in FIG. 10 and along jet 79. Point 135 in FIG. 9 corresponds to constriction 125 in FIG. 10, and is a centrifugal high point.

As the path continues to the right in FIG. 9, corresponding, for example, to movement in passage 54 in FIG. 6 toward bearing 70, the radial position of the path generally increases. The fluid is moving radially outward. The reader is reminded that centrifugal force in FIG. 9 points upward in the Figure, in the direction of arrow 140. All objects tend to fall in the direction of that arrow 140, because of centrifugal force. Thus, constriction 125 in FIG. 10, corresponding to point 135 in FIG. 9, represents a centrifugal high point, and subsequent points on, for example, path 63 in FIG. 5 are centrifugally downhill of that point.

Of course, the passages, such as passage 54 in FIG. 6, could be designed to not run monotonically downhill. By analogy, water in a river flows up and down over rocks and rapids. In the river, the water flows generally downhill, but the water can make uphill excursions during that travel. Similarly, passage 54 could be designed with regions which are centrifugally uphill.

Figure 11:
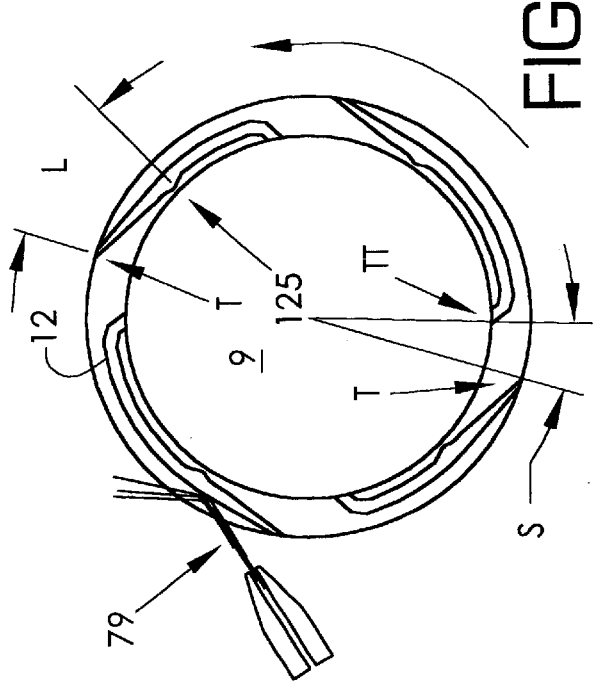
FIGS. 10, 11, 12, and 13 are views in the direction of arrow in FIG. 1, and also show a nozzle expelling lubricant.

In FIG. 11, the shaft 9 has rotated counterclockwise, CCW, compared with FIG. 10. Jet 79 now is not received by space 15, but is deflected off vane 12. The oil within jet 79 is collected by an internal sump (not shown) within the engine 100 in FIG. 8. Such sumps are well known.

Figure 12:
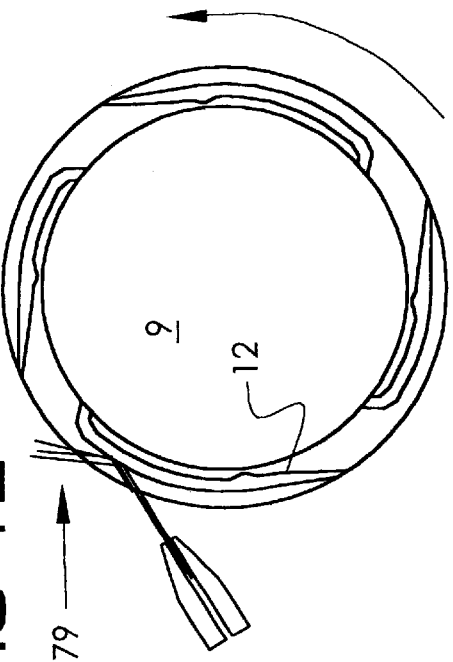

In FIG. 12, shaft 9 has further rotated CCW, and the jet is still deflected.

Figure 13:

In FIG. 13, shaft 9 has rotated still further, and the jet 79 is received by space beneath a succeeding vane 12.

The preceding discussion presumed a 50-50 split of the oil in FIGS. 6 and 7, and that the ball bearing 70 received an equal amount as the roller bearing 73. However, that is not required. For example, passage 51 in FIG. 3 can be located within shaft 30, instead of shaft 6, to provide an unequal number of passages for the two bearings 70 and 73. In this case, bearing 73 in FIG. 5 would receive the majority of the oil.

In an alternate form of the invention, passage 51 in FIG. 3 can be fabricated opposite passage 33. That is, passage 51 would be fabricated within shaft 6, but adjacent vane 12A, while passage 33 would be fabricated as shown. In this case, vane 12A would supply both passages 51 and 33.

In another alternate form of the invention, unequal amounts of oil are provided to each bearing 70 and 73 in FIG. 6, but for a different reason than discussed above. FIG. 10 shows two regions 120 and 120B of identical length, and two regions 120A and 120C of identical length to each other, but shorter than regions 120 and 120B.

To illustrate the difference in lengths, angle AA may lie in the range of 70 degrees, and angle BB may lie in the range of 110 degrees. Angles AA and BB total 180 degrees, in this example. In addition, the length L in FIG. 11 from the constriction 125 to the tail T is the same on each vane 12. Also, the spacings S in FIG. 11 from the tip TT of one vane to the tail T of its neighbor are all the same.

From another point of view, the tails T are uniformly distributed, being 90 degrees apart in this example, but the tips TT are non-uniform, as indicated by angles AA and BB.

With this arrangement, the distribution to bearings 70 and 73 in FIG. 6 would be roughly 60-40 percent.

Reference was made earlier to a downhill gradient from constriction 125 in FIG. 10. However, in certain cases, a downhill gradient may not be necessary, or desired. For example, if the plot of FIG. 9 were horizontal beginning at point 135 and continuing to the right of point 135, oil would still flow to the bearings. In this case, constriction 125 in FIG. 10 would prevent back-flow, but centrifugal force would still drive the oil through the passages, such as passage 51 in FIG. 3.

The oil will not flow over constriction 125 in FIG. 10, unless so much is received that it chokes passage 120. Centrifugal force will cause the oil downstream of constriction 125 to flatten out, and flow toward a bearing. By analogy, gravity will cause water poured onto a level table top to flow over the edges.

Several characterizations of the invention are the following. One, the invention can be viewed as a fluidic multiplexer 150, which receives jet 79 of lubricant in FIGS. 6 and 7, and distributes the lubricant to bearings 70 and 73 via passages 54 and 48. The invention can deliver fluid alternately to the bearings 70 and 73, as described above.

A second characterization is that the invention delivers lubricant from a stationary source 300 in FIG. 6 to nozzle 76 as indicated. Nozzle 76 delivers lubricant to the space 15 (shown in FIG. 1) beneath vane 12 in FIG. 6, which space 15 acts as an entrance to passage 54. This delivery occurs without any fluid conduits, connections, or fluid passages connecting to the entrance. That is, jet 79, once ejected from nozzle 76, is unconfined, and travels across open space between nozzle 76 and vane 12. As the shafts 6 and 30, or rotors, rotate, the spaces 15 in FIG. 1 periodically capture lubricant from the jet 79.

A third characterization is that the vanes 12 in FIG. 1 form scoops which scoop fluid from the jet 79 in FIG. 6. Each vane 12 in FIG. 1, together with shaft 3, defines a scoop. The scoop has a mouth, entrance, or aperture 305, which faces in a generally tangential direction. In plane geometry, tangential is defined as perpendicular to a radius. The term generally tangential is herein defined as perpendicular to a radius of shaft 3, within plus-or-minus 30 degrees.

A fourth characterization is that a single row of vanes is used, to distribute oil to two items, such as two rows of bearings. The two rows may be located on opposite sides of the row of vanes, as in FIG. 6.

Numerous substitutions and modifications can be undertaken without departing from the true spirit and scope of the invention.

What is desired to be secured by Letters Patent is the invention as defined in the following claims:

1. Apparatus, comprising:
   a) a gas turbine engine having two rows of bearings; and
   b) a fluid multiplexer which
      i) receives a jet of lubricant ejected from a nozzle; and
      ii) distributes lubricant to the two rows of bearings,
   wherein the fluid multiplexer does not deliver lubricant to both rows of bearings at the same time.

2. Apparatus, comprising:
   a) a gas turbine engine having two rows of bearings; and
   b) a fluid multiplexer which
      i) receives a jet of lubricant ejected from a nozzle; and
      ii) distributes lubricant to the two rows of bearings,
      wherein the fluid multiplexer delivers lubricant alternately to the two rows.

3. Apparatus, comprising:
   a) a gas turbine engine having two items requiring cooling or lubrication or both; and
   b) a fluid multiplexer containing a single row of vanes which
      i) receives a jet of lubricant ejected from a nozzle; and
      ii) distributes lubricant to the two items.

4. Apparatus according to claim 3, wherein the multiplexer is located between the two items.

5. Apparatus, comprising:
   a) a gas turbine engine having two items requiring cooling or lubrication or both; and b) a fluid multiplexer containing a single row of vanes which
  i) receives a jet of lubricant ejected from a nozzle; and
  ii) distributes lubricant to the two items, wherein the fluid multiplexer does not deliver lubricant to both items simultaneously.

6. Apparatus, comprising:
a) a gas turbine engine having two items requiring cooling or lubrication or both; and
b) a fluid multiplexer containing a single row of vanes which
  i) receives a jet of lubricant ejected from a nozzle; and
  ii) distributes lubricant to the two items, wherein the fluid multiplexer delivers lubricant alternately to the two items.

7. Apparatus, comprising:
a) a gas turbine engine containing a rotor;
b) two rows of bearings adjacent the rotor;
c) several scoops supported by the rotor, having tangentially facing inlets; and
d) a nozzle which sprays a jet of lubricant toward a scoop.

8. Apparatus according to claim 7, and further comprising:
e) means for distributing fluid from the scoops to the rows of bearings.

9. Apparatus according to claim 8, wherein the means drives the fluid centrifugally downhill to the rows.

10. Apparatus according to claim 7, wherein the scoops sequentially capture lubricant from the jet, as the rotor rotates.

11. A method, comprising:
a) in a gas turbine engine, rotating a rotor having apertures on its circumferential surface;
b) spraying liquid lubricant into the apertures; and
c) distributing lubricant received by the apertures to two rows of bearings on the rotor.

12. Method according to claim 11, wherein the spraying operation is performed by a nozzle.

13. Method according to claim 12, wherein the nozzle is non-rotating.

14. Apparatus, comprising:
a) a first row of bearings;
b) a first bearing race adjacent the first row of bearings;
c) a second row of bearings;
d) a second bearing race adjacent the second row of bearings;
e) a cylindrical surface between the two bearing races, containing
  i) a first fluid passage communicating with the first bearing race; and
  ii) a second fluid passage communicating with the second bearing race;
f) a first vane extending generally tangentially from the cylindrical surface, which defines part of an entrance to the first fluid passage;
g) a second vane extending generally tangentially from the cylindrical surface, which defines part of an entrance to the second fluid passage;
wherein the first and second vanes are effective to capture fluid from a fluid jet and direct the captured fluid to the first and second fluid passages.

15. Apparatus according to claim 14, wherein the first and second fluid passages run centrifugally downhill, downstream of their respective entrances.

16. Apparatus, comprising:
a) a gas turbine engine;
b) a bearing system within the engine, comprising a row of roller bearings and a row of ball bearings; and
c) a nozzle which ejects a jet of lubricant across open space to a receiver associated with the bearing system.

17. Apparatus comprising:
a) a gas turbine engine having two rows of bearings; and
b) a fluid multiplexer which
  i) receives a jet of lubricant ejected from a nozzle; and
  ii) distributes lubricant to the two rows of bearings
wherein the fluid multiplexer comprises internal passages and the jet is received by the internal passages.

* * * * *